US012674932B2

(12) United States Patent
Kaneda

(10) Patent No.: US 12,674,932 B2
(45) Date of Patent: Jul. 7, 2026

(54) OPTICAL WAVEGUIDE MOUNTED SUBSTRATE AND METHOD OF MAKING THE SAME

(71) Applicant: SHINKO ELECTRIC INDUSTRIES CO., LTD., Nagano (JP)

(72) Inventor: Hisashi Kaneda, Nagano (JP)

(73) Assignee: SHINKO ELECTRIC INDUSTRIES CO., LTD., Nagano (JP)

( * ) Notice: Subject to any disclaimer, the term of this patent is extended or adjusted under 35 U.S.C. 154(b) by 297 days.

(21) Appl. No.: 18/636,725

(22) Filed: Apr. 16, 2024

(65) Prior Publication Data

US 2024/0353633 A1 Oct. 24, 2024

(30) Foreign Application Priority Data

Apr. 19, 2023 (JP) .................................. 2023-068758

(51) Int. Cl.
*G02B 6/12* (2006.01)
*G02B 6/43* (2006.01)
(52) U.S. Cl.
CPC ........... *G02B 6/12002* (2013.01); *G02B 6/43* (2013.01); *G02B 6/12004* (2013.01)
(58) Field of Classification Search
CPC .. G02B 6/12002; G02B 6/12004; G02B 6/43; G02B 6/4239; G02B 6/424; G02B 6/4243

USPC ......................................... 385/14, 30, 38, 50
See application file for complete search history.

(56) References Cited

U.S. PATENT DOCUMENTS

| | | | |
|---|---|---|---|
| 2006/0120660 A1* | 6/2006 | Rolston .................... | G02B 6/43 |
| | | | 385/88 |
| 2012/0207426 A1* | 8/2012 | Doany ................... | G02B 6/426 |
| | | | 257/E33.056 |
| 2020/0144213 A1 | 5/2020 | Kainuma | |
| 2021/0271037 A1* | 9/2021 | Brusberg ............. | G02B 6/4228 |
| 2023/0083222 A1* | 3/2023 | Darmawikarta ....... | G02B 6/122 |
| | | | 385/14 |

FOREIGN PATENT DOCUMENTS

JP 2020-077715 5/2020

\* cited by examiner

*Primary Examiner* — Robert Tavlykaev
(74) *Attorney, Agent, or Firm* — IPUSA, PLLC

(57) ABSTRACT

An optical waveguide mounted substrate includes an interconnect substrate having a recess that opens on a first surface thereof, and an optical waveguide device including: an optical waveguide substrate including a support and a core layer disposed on the support; and a silicon photonic chip including a silicon substrate and a silicon waveguide disposed on the silicon substrate, the silicon waveguide being optically coupled with the core layer, wherein the optical waveguide substrate is mounted on the interconnect substrate such that the core layer faces away from the recess and at least a part of a thickness of the support is situated inside the recess.

9 Claims, 6 Drawing Sheets

OPTICAL WAVEGUIDE MOUNTED SUBSTRATE AND METHOD OF MAKING THE SAME

CROSS-REFERENCE TO RELATED APPLICATIONS

The present application is based upon and claims the benefit of priority from the prior Japanese Patent Application No. 2023-068758 filed on Apr. 19, 2023, with the Japanese Patent Office, the entire contents of which are incorporated herein by reference.

FIELD

The disclosures herein relate to optical waveguide mounted substrates and methods of making the same.

BACKGROUND

An optical waveguide device having silicon photonic chips and optical waveguides is used to transmit and receive signals in a data center or the like where various computers and data communication apparatuses are installed. In such an optical waveguide device, the core layer of an optical waveguide and the silicon waveguide of a silicon photonic chip are optically coupled to each other.

There is an optical waveguide mounted substrate configured such that an optical waveguide device as described above is mounted on an interconnect substrate. Such an optical waveguide mounted substrate requires both optical coupling between the silicon waveguide of a silicon photonic chip and the core layer of an optical waveguide and electrical coupling between the silicon photonic chip and the interconnect substrate. However, it is not easy to mount the silicon photonic chip and the optical waveguide on the interconnect substrate with sufficient positional accuracy.

There may be a need to provide an optical waveguide mounted substrate capable of improving positional accuracy between a silicon waveguide and a core layer.

[Patent document 1] Japanese Laid-open Patent Publication No. 2020-77715

SUMMARY

According to an aspect of the embodiment, an optical waveguide mounted substrate includes an interconnect substrate having a recess that opens on a first surface thereof, and an optical waveguide device including: an optical waveguide substrate including a support and a core layer disposed on the support; and a silicon photonic chip including a silicon substrate and a silicon waveguide disposed on the silicon substrate, the silicon waveguide being optically coupled with the core layer, wherein the optical waveguide substrate is mounted on the interconnect substrate such that the core layer faces away from the recess and at least a part of a thickness of the support is situated inside the recess.

The object and advantages of the embodiment will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

Figure 1A:
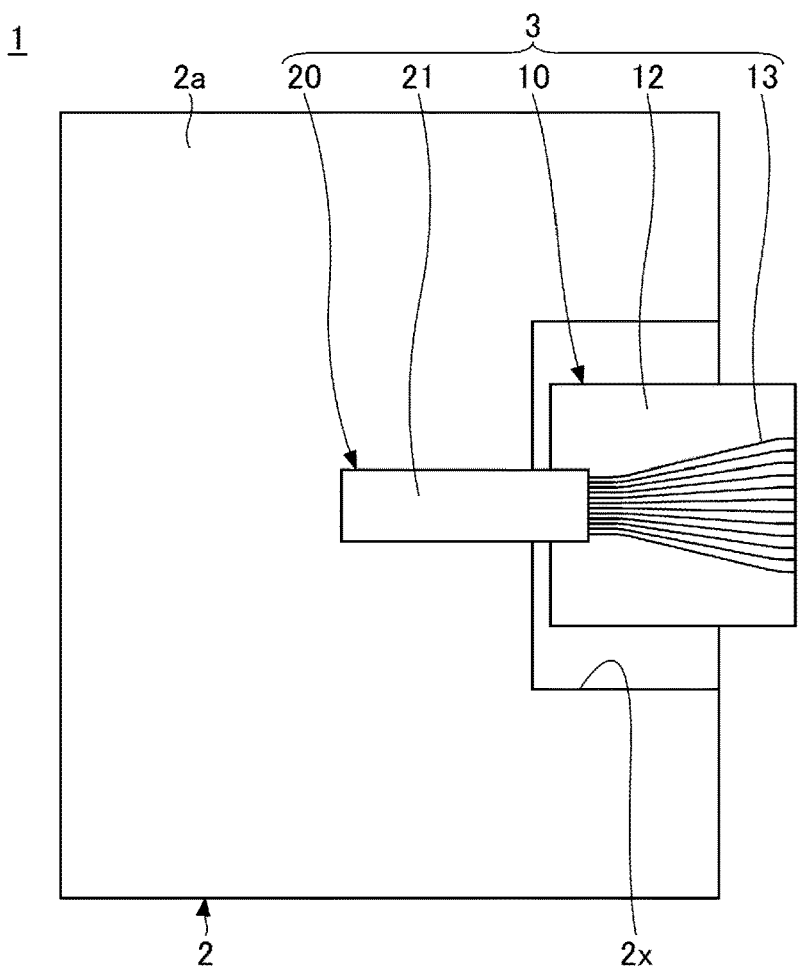
FIGS. 1A and 1B are drawings illustrating an optical waveguide mounted substrate according to the first embodiment.

In the following, embodiments for implementing the invention will be described with reference to the accompanying drawings. In the drawings, the same components are referred to by the same reference numerals, and a duplicate description thereof may be omitted.

First Embodiment

[Optical Waveguide Mounted Substrate]

Figure 1B:
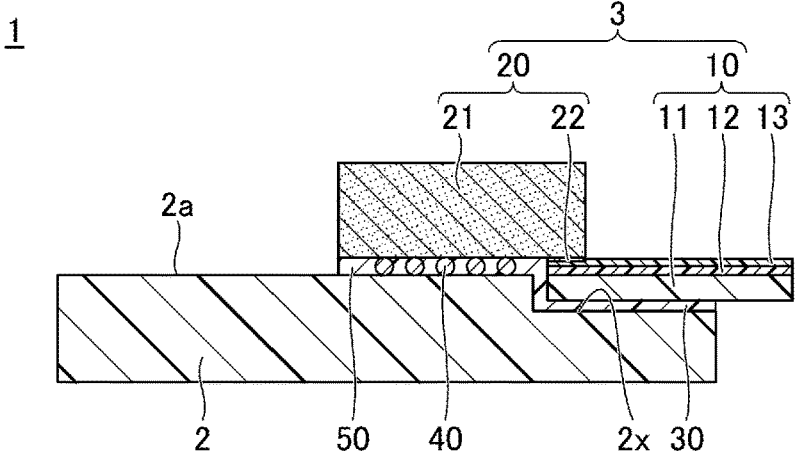
Figure 2:
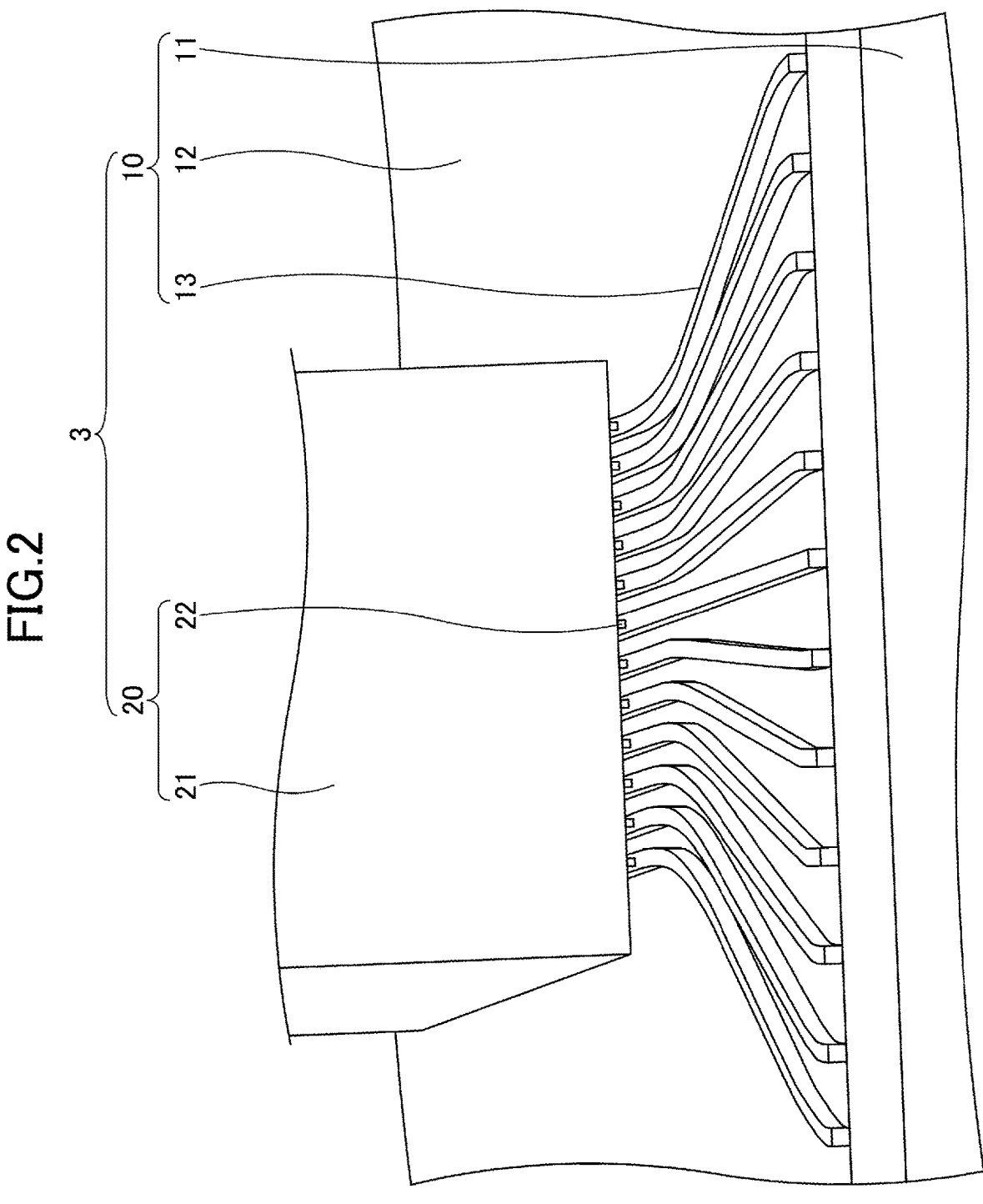
FIG. 2 is a partial perspective view of the optical waveguide mounted substrate of FIG. 1 in the vicinity of the optical waveguide device.

FIGS. 1A and 1B are drawings illustrating an example of an optical waveguide mounted substrate according to a first embodiment, FIG. 1A is a plan view, and FIG. 1B is a longitudinal sectional view taken along a strip of the core layer of FIG. 1A. FIG. 2 is a partial perspective view of the optical waveguide mounted substrate of FIGS. 1A and 1B illustrating the vicinity of an optical waveguide device.

Referring to FIGS. 1A and 1B and FIG. 2, an optical waveguide mounted substrate 1 includes an interconnect substrate 2 and an optical waveguide device 3. The interconnect substrate 2 is, for example, a build-up multilayer interconnect substrate in which interconnect layers and resin insulating layers are alternately laminated. The interconnect substrate 2 has a first surface 2a. In the illustrated example, the first surface 2a is an upper surface.

The interconnect substrate 2 is provided with a recess 2x that is open on the first surface 2a. The recess 2x is set back from the first surface 2a toward the surface opposite to the first surface 2a. The recess 2x may be provided at the edge of the first surface 2a, for example. The recess 2x may have a depth created by removing one or more insulating layers of the interconnect substrate 2, for example. The depth of the recess 2x from the first surface 2a is, for example, about 500 μm.

The optical waveguide device 3 includes an optical waveguide substrate 10 and a silicon photonic chip 20. The optical waveguide substrate 10 includes a support 11, and includes a cladding layer 12 and a core layer 13 disposed on the support 11. A second cladding layer partially covering the core layer 13 may optionally be disposed on the cladding layer 12.

The support 11 serves as a base for supporting the cladding layer 12 and the core layer 13. The support 11 is formed of an insulating resin material such as, for example, glass epoxy resin. The support 11 may be a rigid substrate with strong rigidity or a flexible substrate with weak rigidity. The support 11 may alternatively be a glass substrate. While an organic substrate is easily deformed by heat shrinkage, moisture absorption, etc., the use of a glass substrate serves to reduce deformation. The support 11 may alternatively be a silicon substrate or a ceramic substrate.

The cladding layer 12 is formed on the support 11. The thickness of the cladding layer 12 may be, for example, about 10 μm to 30 μm. The refractive index of the cladding layer 12 may be, for example, about 1.5. The cladding layer 12 may be formed of a photosensitive resin such as a polyimide resin, an acrylic resin, an epoxy resin, a polyolefin resin, a polynorbornene resin or the like.

Strips of the core layer 13 are disposed on the cladding layer 12. The width of each strip of the core layer 13 may be, for example, about 5 μm to 10 μm. The thickness of the core layer 13 may be, for example, about 5 μm to 10 μm. The refractive index of the core layer 13 is higher than the refractive index of the cladding layer 12, and may be, for example, about 1.6. The core layer 13 may be made of, for example, a material selected as appropriate from the examples listed as materials for the cladding layer 12.

Although 12 strips of the core layer 13 are arranged side by side at intervals in the optical waveguide substrate 10, the number of strips of the core layer 13 may be 1 or more. The strips of the core layer 13 may not be formed in a straight line, and may include a curved portion. The spacing between adjacent strips of the core layer 13 may or may not be constant.

The silicon photonic chip 20 includes a silicon substrate 21 and silicon waveguides 22 provided on one side of the silicon substrate 21. Each of the silicon waveguides 22 is a fine optical waveguide incorporated into a silicon chip, and is used in silicon photonic technology for integrating optical circuits and the like in a silicon chip.

The silicon photonic chip 20 is arranged with the silicon waveguides 22 facing toward the core layer 13, and the silicon waveguides 22 are optically coupled with the respective strips of the core layer 13. Part or all of each silicon waveguide 22 may be embedded in the corresponding strip of the core layer 13. In the illustrated example, the silicon waveguides 22 and the core layer 13 are adiabatically coupled. It may be noted, however, that the silicon waveguides 22 suffice to be optically coupled to the core layer 13, and the form of coupling is not limited to the illustrated example. The silicon waveguides 22 and the core layer 13 may be directly coupled, for example.

The thickness of the silicon substrate 21 is, for example, about 100 μm to 800 μm. The silicon waveguides 22 may be disposed, for example, on a protective film disposed on the silicon substrate 21. The protective film may be made of, for example, $SiO_2$ or $SiO_X$. The thickness of the protective film is, for example, about 2 μm to 6 μm.

In plan view, one end of each silicon waveguide 22 may be, for example, tapered. That is, in plan view, the end of the silicon waveguide 22 optically coupled to the core layer 13 may gradually narrows toward the tip. Such a shape improves the optical coupling efficiency between the silicon waveguide 22 and the core layer 13. The width of each silicon waveguide 22 is, for example, about 200 nm to 500 nm, except for the tapered part. The width of the tip of the tapered part is, for example, about ½ to ¼ of the constant width part. The thickness of the silicon waveguide 22 is constant. The thickness of the silicon waveguide 22 is, for example, about 20 nm to 300 nm.

The optical waveguide substrate 10 of the optical waveguide device 3 is mounted on the interconnect substrate 2 such that the core layer 13 faces away from the recess 2x of the interconnect substrate 2, and at least a part of the thickness of the support 11 is located inside the recess 2x. The distance between the bottom surface of the recess 2x and the bottom surface of the support 11 may be, for example, about 10 μm to 100 μm. The recess 2x and the support 11 face each other across a first resin 30. An insulating resin such as an epoxy resin, for example, may be used as the material of the first resin 30. A resin material having high flowability is preferably used as the material of the first resin 30. The high flowability makes it easy to inject the first resin 30 into a space between the recess 2x and the support 11 facing each other. Provision of the first resin 30 allows variations in the thickness and waviness of the support 11 to be absorbed.

The silicon photonic chip 20 of the optical waveguide device 3 may be flip-chip mounted, for example, on the first surface 2a. That is, the electrodes of the silicon photonic chip 20 and the electrodes of the interconnect substrate 2 may be electrically connected through conductive bonding material 40 such as solder. The distance between the lower surface of the silicon substrate 21 and the first surface 2a may be, for example, about 10 μm to 100 μm. A second resin 50 may be disposed in a space between the silicon substrate 21 and the first surface 2a facing each other. The first resin 30 and the second resin 50 may be seamlessly formed of the same material. In addition, a connector or the like (not shown) may be connected to the end face (i.e., the right end face in FIG. 1) of the optical waveguide substrate 10 on the opposite side from where the silicon waveguides 22 and the core layer 13 are optically coupled.

[Method of Making Optical Waveguide Mounted Substrate]

Figure 3A:
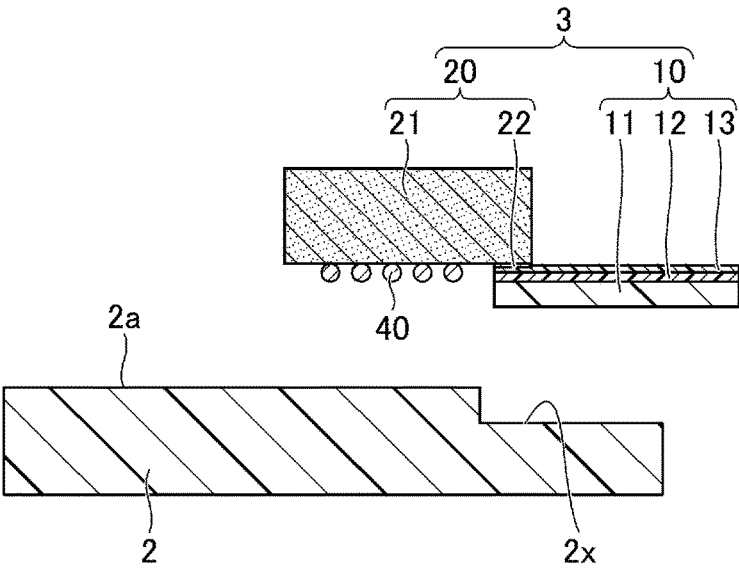
FIGS. 3A through 3C are drawings illustrating a manufacturing process of the optical waveguide mounted substrate according to the first embodiment.
Figure 3B:
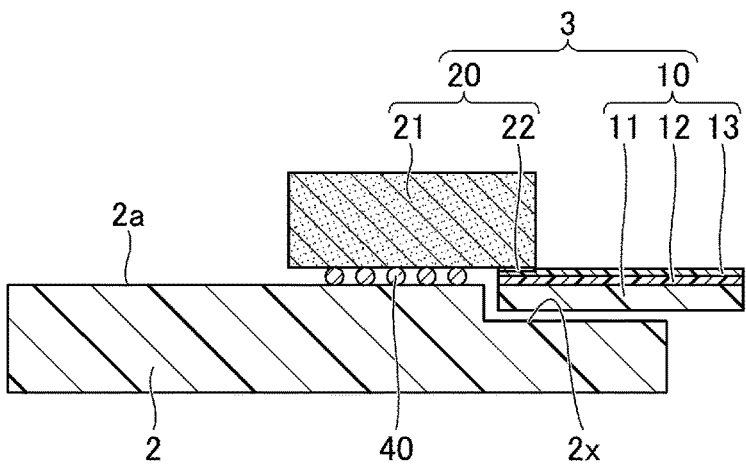
Figure 3C:
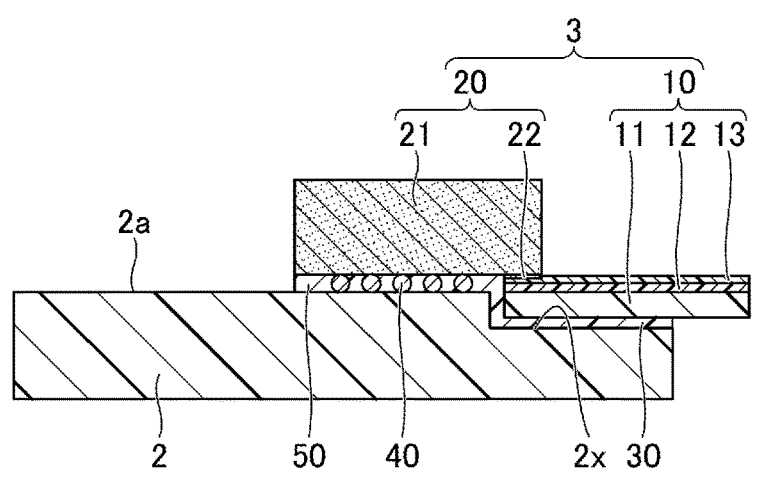

In the following, a method of making the optical waveguide mounted substrate 1 will be described. FIGS. 3A through 3C are drawings illustrating an example of a manufacturing process of the optical waveguide mounted substrate according to the first embodiment.

In the step illustrated in FIG. 3A, the interconnect substrate 2 having the recess 2x that is open on the first surface 2a is prepared, and the optical waveguide device 3 is prepared that has the silicon waveguides 22 of the silicon photonic chip 20 optically coupled with the core layer 13 of the optical waveguide substrate 10. Conductive bonding material 40 such as solder, for example, is bonded to the electrodes of the silicon photonic chip 20. The optical waveguide device 3 may be one which is purchased off the shelf, or may be made by acquiring the optical waveguide substrate 10 and the silicon photonic chip 20 and optically coupling them by using a well-known method.

In the step illustrated in FIG. 3B, the optical waveguide device 3 is mounted on the interconnect substrate 2. Specifically, the optical waveguide device 3 is mounted on the interconnect substrate 2 such that the core layer 13 of the optical waveguide substrate 10 faces away from the recess 2x, and at least a part of the thickness of the support 11 of the optical waveguide substrate 10 is situated inside the recess 2x. In so doing, positional adjustment is made such that the balls of the conductive bonding material 40 are placed on the electrodes of the interconnect substrate 2. The conductive bonding material 40 is then melted and solidified, so that the electrodes of the silicon photonic chip 20 and the electrodes of the interconnect substrate 2 are electrically connected through the conductive bonding material 40.

Optionally, as in the step illustrated in FIG. 3C, the first resin 30 may be disposed in a space between the recess 2x and the support 11 facing each other. For example, a highly flowable resin is poured into the space between the recess 2x and the support 11 facing each other, and cured to form the first resin 30. In this step, the second resin 50 may also be disposed in the space between the silicon substrate 21 and the first surface 2a facing each other.

The first resin 30 and the second resin 50 may be seamlessly formed of the same material. That is, the same resin with high fluidity may be poured into the space between the recess 2*x* and the support 11 facing each other and the space between the silicon substrate 21 and the first surface 2*a* facing each other, and, then, is cured to form the first resin 30 and the second resin 50 seamlessly.

The first resin 30 and the second resin 50 may be formed in separate steps. For example, a highly flowable resin may be poured into the space between the recess 2*x* and the support 11 facing each other, and cured to form the first resin 30. Subsequently, a highly flowable resin may be poured into the space between the silicon substrate 21 and the first surface 2*a* facing each other, and cured to form the second resin 50.

Alternatively, prior to the step illustrated in FIG. 3B, a highly flowable resin may be disposed in the place that is to become the space between the recess 2*x* and the support 11 facing each other and/or in the place that is to become the space between the silicon substrate 21 and the first surface 2*a* facing each other. Thereafter, the step illustrated in FIG. 3B may be performed. This arrangement enables the simultaneous curing of the conductive bonding material 40 and the resin that becomes the first resin 30 and/or the second resin 50.

As described above, the optical waveguide mounted substrate 1 is configured such that the optical waveguide device 3 in which the silicon waveguides 22 of the silicon photonic chip 20 are optically coupled with the core layer 13 of the optical waveguide substrate 10 is mounted on the interconnect substrate 2. That is, the optical coupling between the silicon waveguides 22 and the core layer 13 is made independently of the electrical connection of the optical waveguide device 3 to the interconnect substrate 2. With this arrangement, the optical waveguide device 3 may be mounted on the interconnect substrate 2 without causing positional misalignment between the silicon waveguides 22 and the core layer 13.

In the step illustrated in FIG. 3B, the heights of balls of the conductive bonding material 40 initially vary, and, also, the conductive bonding material 40 undergoes melting, so that the height of the conductive bonding material 40 differs before and after the mounting. However, the optical waveguide mounted substrate 1 is configured such that only the elevation of the optical waveguide device 3 relative to the interconnect substrate 2 is changed, and the positional relationship between the silicon waveguides 22 and the core layer 13, which have already been optically coupled to each other, is not changed. This arrangement makes it possible to maintain high positional accuracy between the silicon waveguides 22 and the core layer 13.

Second Embodiment

The second embodiment is directed to an example in which the support has through-interconnects. In the second embodiment, a description of the same elements as those of the previously described embodiment may be omitted.

[Optical Waveguide Mounted Substrate]

Figure 4:
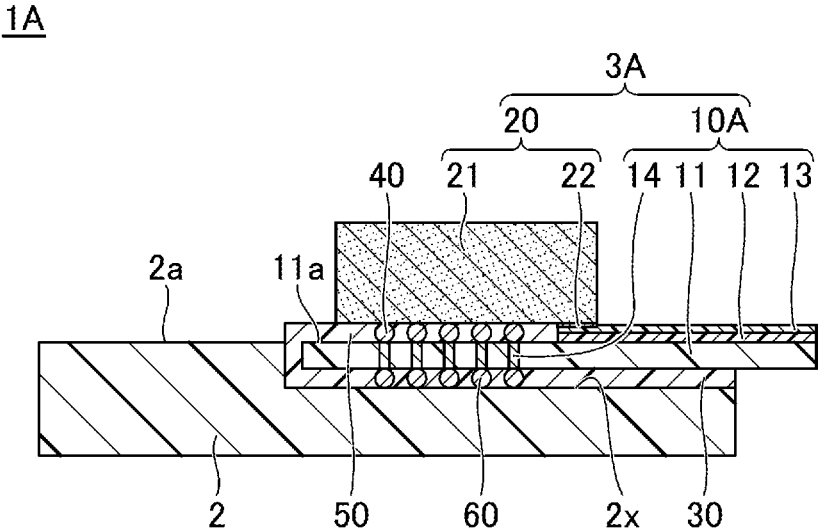
FIG. 4 is a cross-sectional view illustrating an optical waveguide mounted substrate according to a second embodiment.

FIG. 4 is a sectional view illustrating an example of an optical waveguide mounted substrate according to the second embodiment, and illustrates a cross-section corresponding to FIG. 1B.

An optical waveguide mounted substrate 1A illustrated in FIG. 4 differs from the t optical waveguide mounted substrate 1 in that the optical waveguide device 3 is replaced with an optical waveguide device 3A.

The optical waveguide device 3A includes an optical waveguide substrate 10A. In the optical waveguide substrate 10A, the support 11 includes through interconnects 14 penetrating through the support 11. The silicon photonic chip 20 is flip-chip mounted on a second surface 11*a* of the support 11 where the core layer 13 is disposed, such as to be electrically connected to one end of the through interconnects 14. That is, the electrodes of the silicon photonic chip 20 are electrically connected to one end of the respective through interconnects 14 through the conductive bonding material 40 such as solder. The other end of the through interconnects 14 is electrically connected to the respective electrodes of the interconnect substrate 2 in the recess 2*x* through a conductive bonding material 60 such as solder.

The first resin 30 may be disposed in a space between the recess 2*x* and the support 11 facing each other, and the second resin 50 may be disposed in a space between silicon substrate 21 and the second surface 11*a* facing each other. The first resin 30 and the second resin 50 may be seamlessly formed of the same material. Provision of the first resin 30 allows variations in the thickness and waviness of the support 11 to be absorbed.

[Method of Making Optical Waveguide Mounted Substrate]

Figure 5A:
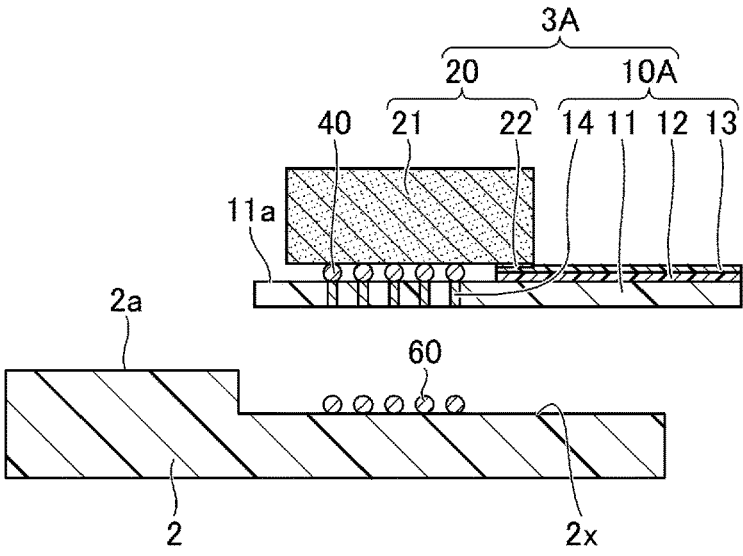
FIGS. 5A through 5C are drawings illustrating a manufacturing process of an optical waveguide mounted substrate according to the second embodiment.
Figure 5B:
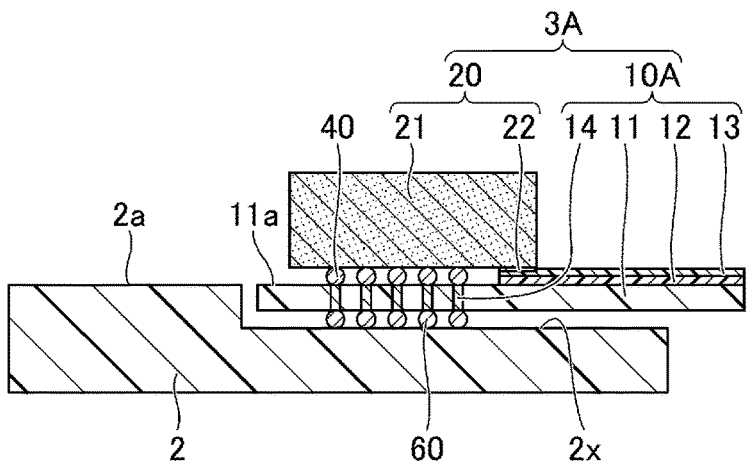
Figure 5C:
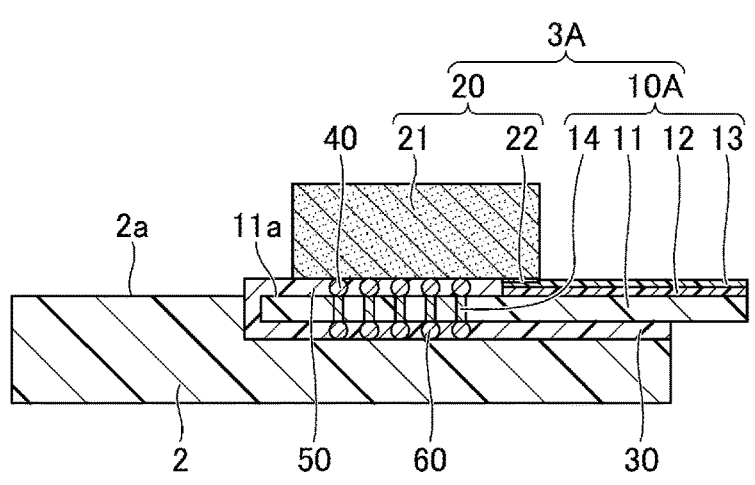

In the following, a method of making the optical waveguide mounted substrate 1A will be described. FIGS. 5A through 5C are drawings illustrating an example of a manufacturing process of the optical waveguide mounted substrate according to the second embodiment.

In the step illustrated in FIG. 5A, the interconnect substrate 2 having the recess 2*x* that is open on the first surface 2*a* is prepared, and the optical waveguide device 3A is prepared that has the silicon waveguides 22 of the silicon photonic chip 20 optically coupled with the core layer 13 of the optical waveguide substrate 10. The support 11 has the through interconnects 14 penetrating through the support 11. The silicon photonic chip 20 is flip-chip mounted on the second surface 11*a* of the support 11 where the core layer 13 is disposed, such as to be electrically connected to one end of the through interconnects 14. The conductive bonding material 60 such as solder, for example, is bonded to the electrodes of the interconnect substrate 2. The optical waveguide device 3A may be one which is purchased off the shelf, or may be made by acquiring the optical waveguide substrate 10A and the silicon photonic chip 20 and optically coupling them by using a well-known method.

In the step illustrated in FIG. 5B, the optical waveguide device 3A is mounted on the interconnect substrate 2. Specifically, the optical waveguide device 3A is mounted on the interconnect substrate 2 such that the core layer 13 of the optical waveguide substrate 10 A faces away from the recess 2*x* and at least a part of the thickness of the support 11 of the optical waveguide substrate 10A is situated in the recess 2*x*. In so doing, positional adjustment is made such that the other end of the through interconnects 14 is placed on the conductive bonding material 60. The conductive bonding material 60 is then melted and solidified, so that the other end of the through interconnects 14 is electrically connected to the respective electrodes of the interconnect substrate 2 through the conductive bonding material 60.

In the optional step illustrated in FIG. 5C, the first resin 30 is disposed in the space between the recess 2*x* and the support 11 facing each other according to need. In this step, the second resin 50 may also be disposed in the space between the silicon substrate 21 and the second surface 11*a* facing each other. The first resin 30 and the second resin 50 may be seamlessly formed of the same material. That is, the same resin material having high fluidity is poured into the space between the recess 2x and the support 11 facing each other and the space between the silicon substrate 21 and the second surface 11a facing each other. The resin is then cured to form a seamless structure comprised of the first resin 30 and the second resin 50. The recess 2x may optionally be made to have the depth that ensures the positional relationship allowing the second resin 50 to be formed inside the recess 2x.

The first resin 30 and the second resin 50 may be formed in separate steps. The second resin 50 may be formed in the step illustrated in FIG. 5A. The first resin 30 may be disposed prior to the step illustrated in FIG. 5B.

As described above, the optical waveguide mounted substrate 1A is configured such that the optical waveguide device 3A in which the silicon waveguides 22 of the silicon photonic chip 20 are optically coupled with the core layer 13 of the optical waveguide substrate 10A is mounted on the interconnect substrate 2 in substantially the same manner as in the optical waveguide mounted substrate 1. That is, the optical coupling between the silicon waveguides 22 and the core layer 13 is made independently of the electrical connection of the optical waveguide device 3A to the interconnect substrate 2. With this arrangement, the optical waveguide device 3A may be mounted on the interconnect substrate 2 without causing a positional misalignment between the silicon waveguides 22 and the core layer 13.

Variation of First Embodiment

A variation of the first embodiment is directed to an example in which a semiconductor chip is mounted on the interconnect substrate. In the variation of the first embodiment, a description of the same elements as those of the previously described embodiments may be omitted.

Figure 6:
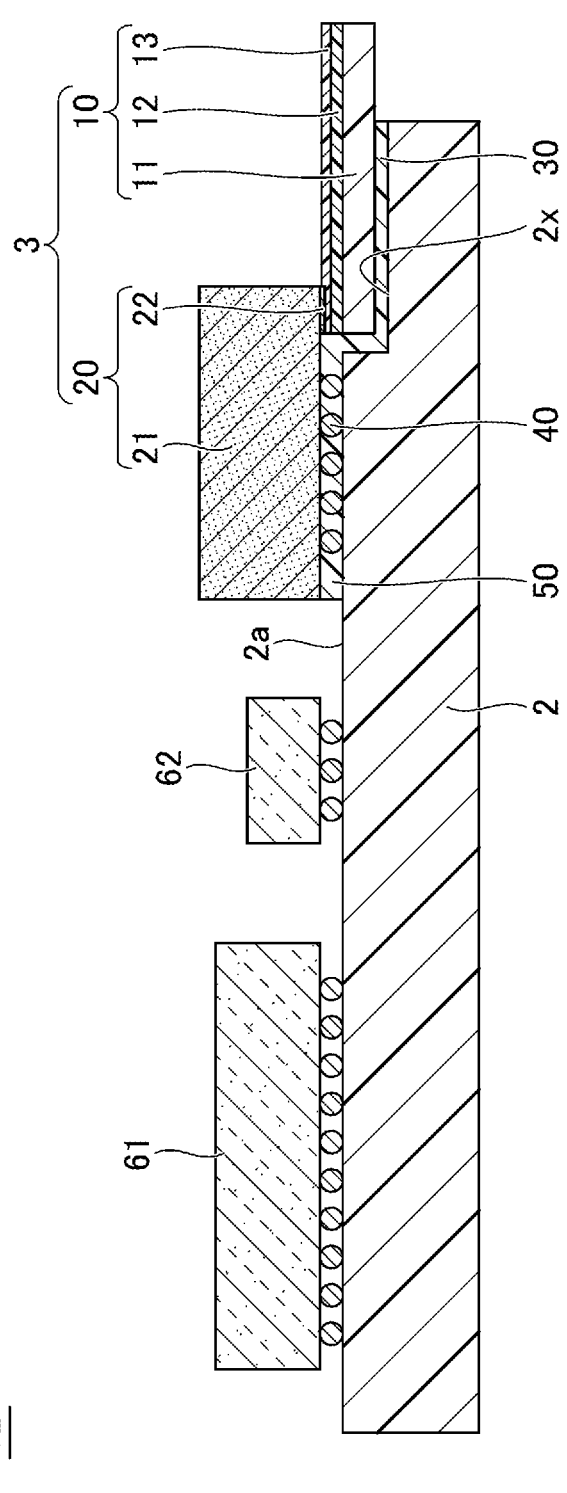
FIG. 6 is a cross-sectional view illustrating an optical waveguide mounted substrate according to a variation of the first embodiment.

FIG. 6 is a cross-sectional view illustrating an example of optical waveguide mounted substrate according to the variation of the first embodiment, and illustrates a cross-section corresponding to FIG. 1B.

An optical waveguide mounted substrate 1B illustrated in FIG. 6 differs from the optical waveguide mounted substrate 1 in that semiconductor chips 61 and 62 are provided.

The semiconductor chips 61 and 62 are flip-chip mounted on, for example, the first surface 2a of the interconnect substrate 2. The semiconductor chip 61 is, for example, an ASIC or a logic IC. The semiconductor chip 62 is, for example, a PHY chip. The PHY chip is a chip that forms a physical-layer interface and may, for example, encode and decode data.

In the manner described above, one or more semiconductor chips may be mounted on the interconnect substrate 2. The semiconductor chips are not limited to those having the above-noted functions, and may have other functions. The number of semiconductor chips mounted on the interconnect substrate 2 may be one, or may be three or more.

According to at least one embodiment, an optical waveguide mounted substrate is provided that is capable 4 the positional accuracy between a silicon waveguide and a core layer.

The present disclosures non-exhaustively include the subject matter set out in the following clauses.

Clause 1. A method of making an optical waveguide mounted substrate, comprising:
providing an interconnect substrate having a recess that opens on a first surface thereof;
providing an optical waveguide device including:
an optical waveguide substrate including a support and a core layer disposed on the support; and a silicon photonic chip including a silicon substrate and a silicon waveguide disposed on the silicon substrate, the silicon waveguide being optically coupled with the core layer; and
mounting the optical waveguide device on the interconnect substrate, such that the core layer of the optical waveguide substrate faces away from the recess, and at least a part of a thickness of the support of the optical waveguide substrate is situated inside the recess.

Clause 2. The method of making an optical waveguide mounted substrate as recited in Clause 1, further comprising placing a first resin in a space between the recess and the support facing each other.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:
1. An optical waveguide mounted substrate comprising:
an interconnect substrate having a recess that opens on a first surface thereof, and
an optical waveguide device including:
an optical waveguide substrate including a support and a core layer disposed on the support; and
a silicon photonic chip including a silicon substrate and a silicon waveguide disposed on the silicon substrate, the silicon waveguide being optically coupled with the core layer,
wherein the optical waveguide substrate is mounted on the interconnect substrate, after the silicon waveguide is coupled to the core layer, such that the core layer faces away from the recess and at least a part of a thickness of the support is situated inside the recess.

2. The optical waveguide mounted substrate as claimed in claim 1, further comprising a first resin disposed in a space between the recess and the support facing each other.

3. The optical waveguide mounted substrate as claimed in claim 2, wherein the silicon photonic chip is flip-chip mounted on the first surface.

4. The optical waveguide mounted substrate as claimed in claim 3, further comprising a second resin disposed in a space between the silicon substrate and the first surface facing each other.

5. The optical waveguide mounted substrate as claimed in claim 2, wherein
the support includes a through interconnect penetrating through the support, and
the silicon photonic chip is flip-chip mounted on a second surface of the support where the core layer is provided, such as to be electrically connected to one end of the through interconnect, and
another end of the through interconnect is electrically connected to the interconnect substrate inside the recess.

6. The optical waveguide mounted substrate as claimed in claim 5, further comprising a second resin disposed in a space between the silicon substrate and the second surface facing each other.

7. The optical waveguide mounted substrate as claimed in claim 4, wherein the first resin and the second resin are seamlessly formed of a same material.

8. The optical waveguide mounted substrate as claimed in claim 3, wherein the support is a glass substrate.

9. An optical waveguide mounted substrate comprising:

an interconnect substrate having a recess that opens on a first surface thereof; and an optical waveguide device including:

an optical waveguide substrate including a support and a core layer disposed on the support; and a silicon photonic chip including a silicon substrate and a silicon waveguide disposed on the silicon substrate, the silicon waveguide being optically coupled with the core layer, wherein the optical waveguide substrate is mounted on the interconnect substrate such that the core layer faces away from the recess and at least a part of a thickness of the support is situated inside the recess, wherein the support includes a through interconnect penetrating through the support, and the silicon photonic chip is flip-chip mounted on a second surface of the support where the core layer is provided, such as to be electrically connected to one end of the through interconnect, and another end of the through interconnect is electrically connected to the interconnect substrate inside the recess.

* * * * *